(12) United States Patent
Vial et al.

(10) Patent No.: US 7,570,372 B2
(45) Date of Patent: Aug. 4, 2009

(54) OPTICAL DEVICE FOR MEASURING THE THICKNESS OF AN AT LEAST PARTIALLY TRANSPARENT MEDIUM

(75) Inventors: Franck Vial, Paladru (FR); Philippe Peltie, Saint Paul de Varces (FR); Angelo Guiga, Tullins (FR)

(73) Assignee: Commissariat a l'Energie Atomique, Paris (FR)

( * ) Notice: Subject to any disclaimer, the term of this patent is extended or adjusted under 35 U.S.C. 154(b) by 321 days.

(21) Appl. No.: 11/629,355

(22) PCT Filed: Jun. 24, 2006

(86) PCT No.: PCT/FR2005/001603

§ 371 (c)(1),
(2), (4) Date: Dec. 12, 2006

(87) PCT Pub. No.: WO2006/013247

PCT Pub. Date: Feb. 9, 2006

(65) Prior Publication Data

US 2008/0068619 A1 Mar. 20, 2008

(30) Foreign Application Priority Data

Jul. 6, 2004 (FR) .................................. 04 07493

(51) Int. Cl.
*G01B 11/28* (2006.01)
(52) U.S. Cl. ..................................... 356/630
(58) Field of Classification Search ....................... None
See application file for complete search history.

(56) References Cited

U.S. PATENT DOCUMENTS

| 3,693,025 | A | | 9/1972 | Brunton |
| 4,687,333 | A | | 8/1987 | Odasima et al. |
| 5,105,157 | A | | 4/1992 | Schmitt |
| 6,038,028 | A | * | 3/2000 | Grann et al. ................. 356/630 |
| 6,111,649 | A | * | 8/2000 | Tominaga et al. ............ 356/630 |
| 6,657,736 | B1 | * | 12/2003 | Finarov et al. .............. 356/625 |

FOREIGN PATENT DOCUMENTS

DE 41 41 446 C1 2/1993
DE 198 05 200 A1 8/1999

* cited by examiner

*Primary Examiner*—Gregory J Toatley, Jr.
*Assistant Examiner*—Juan D Valentin
(74) *Attorney, Agent, or Firm*—Oliff & Berridge, PLC

(57) ABSTRACT

The inventive optical device for measuring the thickness of a medium which is at least partially transparent for an incident beam and covers a second medium comprises a laser for generating the light incident beam in such a way that a beam reflected by the first medium surface and a beam scattered by the second medium surface are formed. The device comprises a photosensitive linear array for detecting the reflected beam and the scattered beam and a processing circuit which is connected to the linear array and enables to measure a space between the reflected beam and the scattered beam and to determine the thickness of the first medium according to the measured space. The processing circuit determines a distance between the linear array and the surface of the second medium from the position of at least one beam and corrects the valve of the thickness of the first medium according to the distance.

6 Claims, 2 Drawing Sheets

US 7,570,372 B2

OPTICAL DEVICE FOR MEASURING THE THICKNESS OF AN AT LEAST PARTIALLY TRANSPARENT MEDIUM

BACKGROUND OF THE INVENTION

The invention relates to an optical device for measuring the thickness of a first medium that is at least partially transparent for an incident beam and covers a second medium, the device comprising means for generating the incident light beam so as to form a beam reflected by the surface of the first medium and a beam scattered by the surface of the second medium, detection means for detecting the reflected beam and the scattered beam, processing means, connected to the detection means, comprising means for measuring the gap between the reflected beam and the scattered beam, and means for determining the thickness of the first medium according to the measured gap.

STATE OF THE ART

Measuring the thickness of a first medium, at least partially transparent for incident wavelengths and covering a second medium, for example measuring the thickness of a film of water on a road, is well known in the prior art.

A first method consists in using sensors to measure the thickness of a layer of water on the ground. It is possible to use a sensor inserted in the ground or a sensor measuring the variations of the solidification temperature of the water.

Another method is described in the Patent U.S. Pat. No. 5,105,157, which relates to a radar system to measure the mean thickness of a film of water on the surface of a road. The system comprises at least two sub-assemblies, each presenting a transmitter and a receiver and operating at different frequencies. It uses reflection of microwaves on the surface of the film of water. The behaviour of the radar and its precision depend greatly on the environment in which it operates.

The Patent U.S. Pat. No. 4,687,333 describes another method for measuring thickness, by means of an optical device using absorption of the wavelength of a light projected on a film of water. The projected light is reflected by the film of water and converted into an electric signal by means of a photoelectric sensor. The device then calculates the thickness of the film of water according to the electric signal thus recovered. This device is relatively complex and the measuring precision is greatly dependent on the absorption coefficient of the film of water.

The document DE 198 05 200 describes another method for measuring the thickness of a transparent object, using the leading edge of a first reflection signal, detected by detection means, to determine the position of the emitting source or of the detection means with respect to the object. When a second reflection signal, superposed on the first signal, is also detected by the detection means, the measuring method takes account of the trailing edge of this second signal to correct and adjust the value of the previously calculated position. The value of the thickness is deduced only from the measurements of the position of the emitting source or of the detection means with respect to the object. This results in a calculation largely dependent on the environmental conditions in which the detection means and emitting source are located.

In a general manner, known optical devices for measuring the thickness of a first, at least partially transparent, medium covering a non-transparent second medium conventionally comprise means for generating a light beam, means for detecting the beam reflected by the at least partially transparent medium and the beam scattered by the non-transparent medium, and processing means, connected to the means for detecting, designed to measure the gap between the two beams and to determine the thickness of the first medium according to the measured gap, by means of a predetermined mathematical formula.

Such fixed devices are generally used for smooth surfaces. However, the use of such a device supported by a moving object, changing altitude with respect to the surface of the first medium, introduces non-negligible calculation errors. In particular, in the case of a device carried by a car moving on a road, the errors are acceptable so long as the movement of the car is straight, but become too large in bends or when braking, when the car sags and causes a change of altitude of the device.

OBJECT OF THE INVENTION

The object of the invention is to remedy these shortcomings and has the purpose of providing an optical measuring device determining the thickness of a medium with precision.

According to the invention, this object is achieved by the appended claims and more particularly by the fact that the detection means comprise means for measuring the position of at least one of the reflected and scattered beams, the processing means comprising means for determining the distance between the detection means and the surface of the second medium, according to the measured position, and means for correcting the value of the thickness of the first medium, according to said distance.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
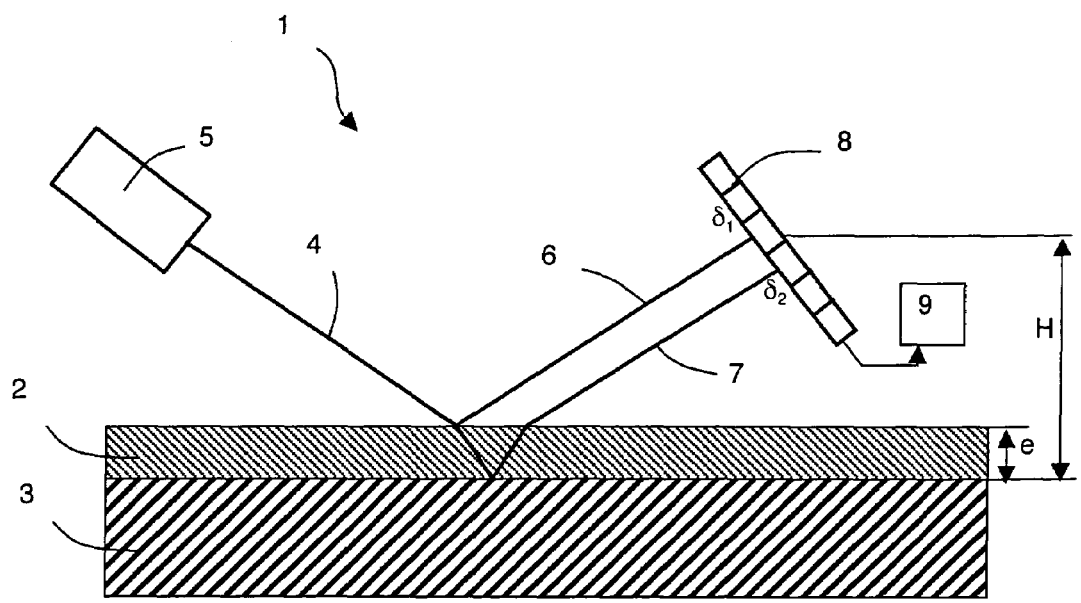
FIG. 1 schematically represents a particular embodiment of a device according to the invention.

In FIG. 1, the optical measuring device 1 is designed to measure the thickness e of a first, at least partially transparent, medium 2, for example a film of water, totally covering a second medium 3, for example an asphalt road.

In known manner, a preferably collimated incident light beam 4 is generated by any appropriate means, for example by a laser 5, and is sent in the direction of the ground with a predetermined angle of incidence. A part of the incident beam 4 is reflected by the free surface of the first medium 2 so as to form a reflected beam 6, whereas another part of the incident beam 4 is transmitted to the thickness e of the first medium 2. This part of the incident beam 4 is scattered by the top surface of the second medium 3, in contact with the first medium 2, in the whole upper half-space.

The reflected beam 6 and a part 7 of the scattered beam are then collected by any suitable detection means, in known manner, for example a photosensitive spatial detector. The detector is for example formed by a photosensitive array 8, of the charge coupled device (CCD) type, and is situated above the surface of the first medium 2. This type of detector conventionally comprises a plurality of elements which deliver a more or less intense electrical signal according to the quantity of photons received. This enables values $\delta_1$ and $\delta_2$ representative of the positions of the impact of the beams 6 and 7 on the array 8, corresponding to the location of the two light intensity maxima measured by the array 8, to be measured quickly.

Figure 2:
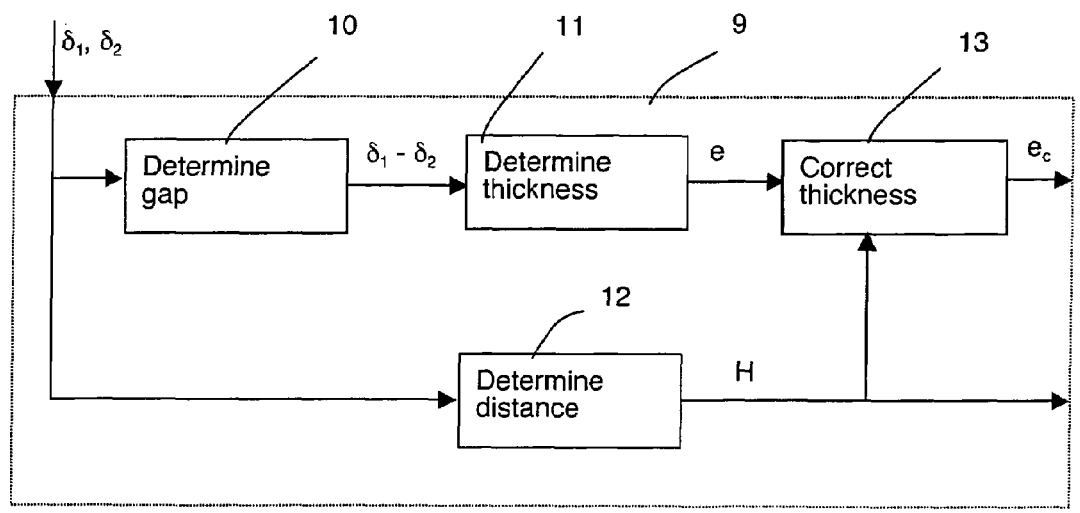
FIG. 2 is a diagram illustrating a particular embodiment of the processing circuit according to FIG. 1.

As represented in FIG. 2, at each predetermined measuring time, a processing circuit 9, connected to the array 8, determines the values $\delta_1$ and $\delta_2$ representative of the position of the points of impact of the reflected beam 6 and of the scattered beam 7 on the array 8, and deduces therefrom (block 10) the gap existing between the beams 6 and 7. It then determines (block 11) the thickness e of the first medium 2 according to the measured gap. Indeed, the gap measured on the array 8 is directly linked to the thickness e of the first medium 2 by a mathematical equation of the type $e=k(\delta_1-\delta_2)$, with k a proportionality constant and $\delta_1$, $\delta_2$ the measured values representative of the positions of the images of the two beams 6 and 7 on the array 8.

Such a thickness measurement is not however always sufficiently precise. According to the invention, the processing circuit 9 performs correction of measurement of the thickness e taking account of the distance H separating the detector (array 8) from the top surface of the second medium 3.

In the particular embodiment represented in FIG. 2, the processing circuit 9 also determines (block 12), according to the known principle of optical triangulation, the distance H from the position of the images of the reflected beam 6 or of the scattered beam 7 on the array 8, or even advantageously the images of the two beams 6 and 7 on the array 8, to make measuring more robust. The processing circuit 9 determines (block 12) the distance H between the array 8, preferably between the centre of gravity of the array 8 and the top surface of the second medium 3 (FIG. 1), from the values $\delta_1$ and $\delta_2$. In a preferred embodiment, a reference distance $H_0$ is previously determined by triangulation, in a calibration phase, when the device 1 is at rest. At each time t, the variation of the distance H with respect to this reference distance $H_0$ is given by: $H-H_0=k'(\delta(t)-\delta(t_0))$, where k' is a proportionality constant and $\delta(t)$ and $\delta(t_0)$ are the values of $\delta 1$ or of $\delta 2$ representing the positions of one of the beams 6 and 7 on the array 8, respectively at the time t and when calibration is performed.

In this way, any variation of the distance H linked to variations of the profile of the second medium 3, in particular when movement of the device 1 takes place along the media 2 and 3, is taken into account.

As represented in FIG. 2, the processing circuit 9 corrects (block 13) the initially calculated value of the thickness e according to the distance H. The device 1 therefore enables a corrected thickness $e_c$ of the first medium 2 to be determined, which is much more precise and more representative of the media 2 and 3 than the value e calculated, in conventional manner, solely as a function of the gap between the beams 6 and 7. The device 1 also enables the variations of the distance H to be monitored throughout the horizontal movement of the device 1, which enables both the corrected thickness $e_c$ of the first medium 2 and the distance H between the array 8 and the top surface of the second medium 3 to be obtained simultaneously at each measuring moment.

For example, a device 1 with a length of about 250 mm, situated about 100 mm above a rough surface 3 covered by a film of water 2, and which emits a light beam 4 with an angle of incidence close to 45° enables a variation of the thickness e of the film of water of about 100 µm to be detected with a photosensitive array 8 presenting an inter-pixel pitch of 60 µm.

Such an optical measuring device 1 procures the following advantages in particular. Measurement of the thickness e is performed with precision without any contact with the first medium 2 and therefore does not disturb its environment. The optical principle used by the device 1 enables the variations of the thickness e of the medium 2 to be monitored with precision in real time, when the device 1 moves horizontally above the surface of the medium 2, due to the distance H being taken into account. Calculation of the distance H is performed without having recourse to an additional measuring device, as the device 1 uses the same values $\delta_1$ and $\delta_2$ representative of the positions of the beams 6 and 7 on the array 8.

Moreover, as the measuring method used by the device 1 works on measuring the positioning $\delta_1$, $\delta_2$ of light peaks on the array 8, it is not affected, in particular, by any amplitude measurement of the fluctuations of intensity of the incident beam 4.

Figure 3:
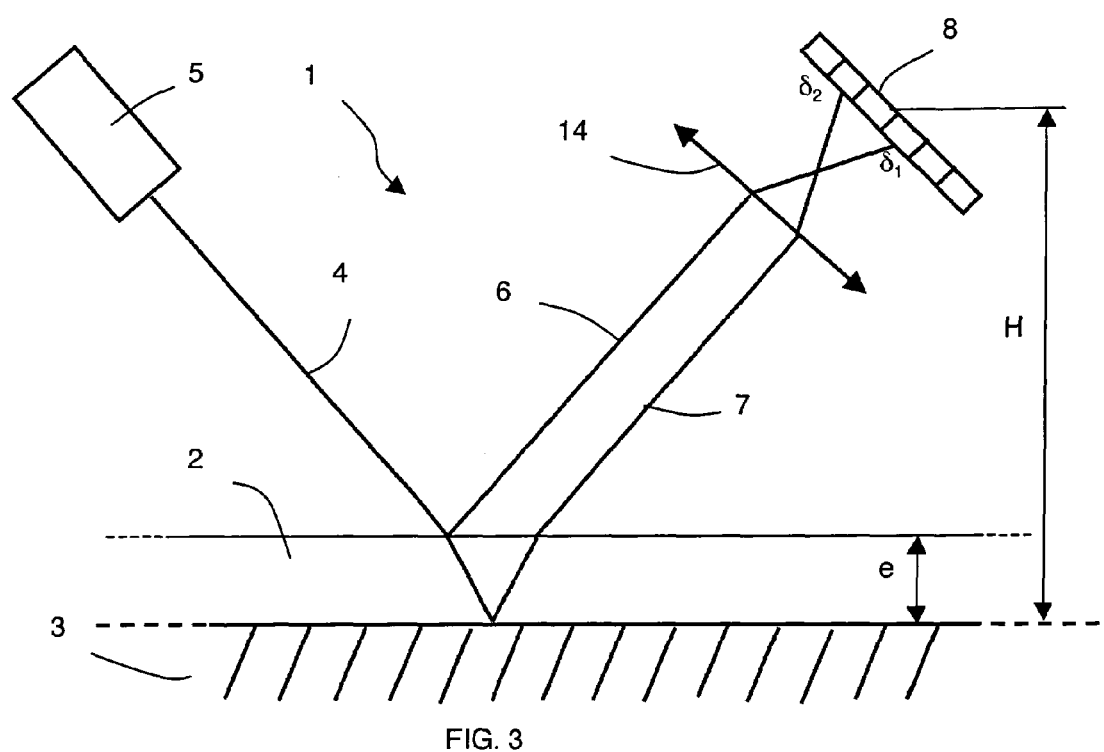
FIG. 3 schematically represents an alternative embodiment of a device according to the invention.

In the alternative embodiment represented in FIG. 3, the optical measuring device 1 differs from the previous embodiment by the presence of means for focussing the reflected beam 6 and the scattered beam 7 on the array 8. For example, a convergent lens 14 is placed between the first medium 2 and the photosensitive array 8 so as to make the reflected beam 6 and the scattered beam 7 converge on the array 8.

According to the relative positions of the lens 14 and of the photosensitive array 8 with respect to the first medium 2, to the angle of incidence of the beam 4 and the resolution of the photosensitive detector, the resolution and precision of the measurements $\delta_1$ and $\delta_2$ of the reflected beam 6 and of the scattered beam 7 can then be adjusted, for a given distance H.

The invention is not limited to the different embodiments described above. Particularly, the second medium 3 can be any surface able to scatter the incident light beam 4 and the first medium 2 can be any liquid or solid medium, provided that the latter is sufficiently transparent for the wavelength of the incident light beam 4 and the intensity of the reflected beam 6 reflected by the medium 2 not to be negligible compared with the amplitude of the beam transmitted to the medium 2. These two conditions are necessary for the two maxima measured by the array 8 to stand out sufficiently from the background noise picked up by the array 8.

Furthermore, the device 1 described above is not limited to a range of thickness e of the first medium 2, nor to a range of distance H separating the top surface of the second medium 3 from the array 8. The choice of the components of the device 1 and their size depends directly on the intended application and the expected performances.

Figure 4:
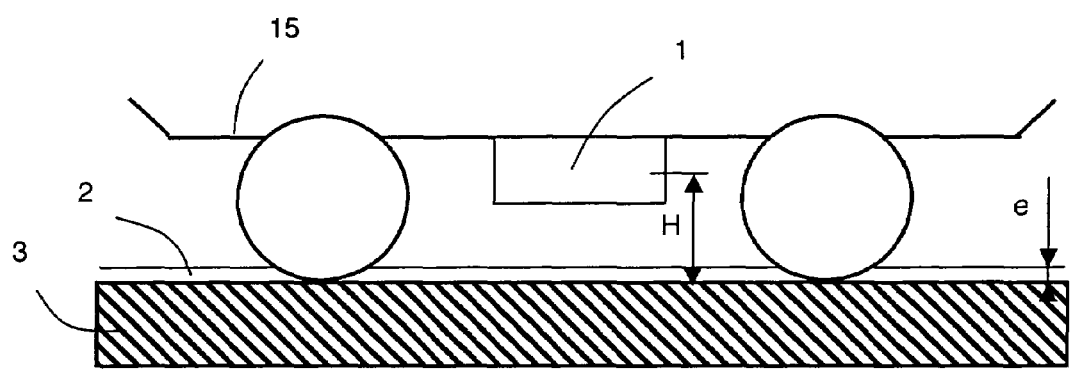
FIG. 4 represents a particular application comprising a device according to the invention.

A preferred application for the device 1 according to the invention is represented in FIG. 4. The device 1 is fitted under a vehicle 15 so as to measure the thickness e of the film of water on a road in real time and to thus supply this information, possibly in parallel with the distance H, to a dynamic behaviour management system of the vehicle 15.

Another application can concern an ergonomic enclosure in the form of a hand tool comprising the device 1 according to the invention, to enable a user to rapidly measure the thickness of a layer of ice on the wings of a plane without prior calibration.

The device 1 can also be used to assess the surface condition of a rough object covered by a liquid or a solid. In particular, the device can be implemented to quantify the surface condition of the bottom of a tank containing for example a corrosive liquid product, which would prevent the use of any other instrument having to be totally or partially immersed in this liquid to perform the same type of measurement.

The invention claimed is:

1. An optical device for measuring a thickness of a first medium that is at least partially transparent for an incident beam and covers a second medium, the device comprising:
   means for generating the incident light beam so as to form a reflected beam reflected by the surface of the first medium and a scattered beam scattered by a surface of the second medium;
   detection means for detecting the reflected beam and the scattered beam;
   processing means connected to the detection means, the processing means having means for measuring a gap between the reflected beam and the scattered beam and means for determining the thickness of the first medium according to the measured gap,
   wherein the detection means has means for measuring a position of at least one of the reflected beam and scattered beam,
   the processing means has means for determining the distance between the detection means and the surface of the second medium, according to the measured position, and means for correcting the value of the thickness of the first medium, according to said distance,
   the position is a point at which the at least one of the reflected beam and the scattered beam impacts the detection means, and
   the gap is the distance between a point of impact of the reflected beam and a point of impact of the scattered beam on the detection means.

2. The device according to claim 1, wherein the means for detecting the reflected beam and the scattered beam comprise a photosensitive spatial detector.

3. The device according to claim 2, wherein the photosensitive spatial detector is an array of the charge coupled device type.

4. The device according to claim 1, wherein the means for generating the incident beam comprise a laser.

5. The device according to claim 1, further comprising means for focussing the reflected beam and the scattered beam on the detection means, the means for focusing located between the media and the detection means.

6. The device according to claim 5, wherein the means for focussing comprise a convergent lens.

* * * * *

UNITED STATES PATENT AND TRADEMARK OFFICE
CERTIFICATE OF CORRECTION

PATENT NO. : 7,570,372 B2  Page 1 of 1
APPLICATION NO. : 11/629355
DATED : August 4, 2009
INVENTOR(S) : Franck Vial et al.

It is certified that error appears in the above-identified patent and that said Letters Patent is hereby corrected as shown below:

Title Page

Please DELETE the following:

"(22)    PCT Filed:    Jun. 24, 2006"

and REPLACE with:

--(22)    PCT Filed:    Jun. 24, 2005--

Signed and Sealed this

Twenty-second Day of September, 2009

David J. Kappos
*Director of the United States Patent and Trademark Office*